(12) United States Patent
Dropmann (10) Patent No.: US 10,677,590 B2
(45) Date of Patent: Jun. 9, 2020

(54) METHOD AND DEVICE FOR ASSESSING THE QUALITY OF COATED SURFACES

(71) Applicant: GROB-WERKE GmbH & Co. KG, Mindelheim (DE)

(72) Inventor: Maximilian Dropmann, Kaufbeuren (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 273 days.

(21) Appl. No.: 15/982,222

(22) Filed: May 17, 2018

(65) Prior Publication Data
US 2018/0335301 A1 Nov. 22, 2018

(30) Foreign Application Priority Data
May 18, 2017 (EP) ..................... 17171668

(51) Int. Cl.
*G06T 7/00* (2017.01)
*G01B 11/30* (2006.01)
(Continued)

(52) U.S. Cl.
CPC ......... *G01B 11/30* (2013.01); *G01N 15/0806* (2013.01); *G01N 15/088* (2013.01); *G01N 21/8422* (2013.01); *G01N 21/8806* (2013.01); *G01N 21/8851* (2013.01); *G06T 7/001* (2013.01); *G01N 2021/8427* (2013.01); *G01N 2021/8887* (2013.01)

(58) Field of Classification Search
CPC .. G01B 11/30; G01N 15/0806; G01N 15/088; G01N 21/8422; G01N 21/8806; G01N 21/8851; G01N 2021/8427; G01N 2021/8887; G06T 7/001
See application file for complete search history.

(56) References Cited

U.S. PATENT DOCUMENTS

2002/0055571 A1 * 5/2002 Hirano ..................... C08K 3/34
524/413
2012/0231322 A1 * 9/2012 Chu ....................... H01M 4/505
429/144

(Continued)

FOREIGN PATENT DOCUMENTS

JP 5257756 B2 8/2013

OTHER PUBLICATIONS

Bobzin, K. et al., "Coating Bores of Light Metal Engine Blocks with a Nanocomposite Material using the Plasma Transferred Wire Arc Thermal Spray Process", Journal of Thermal Spray Technology, vol. 17(3), pp. 344-351, Published Jul. 3, 2008.

(Continued)

*Primary Examiner* — Sean T Motsinger
(74) *Attorney, Agent, or Firm* — J-Tek Law PLLC; Jeffrey D. Tekanic; Scott T. Wakeman (57) ABSTRACT

A method and a device are capable of assessing the quality of a coating of a component, such as a cylinder bore, by determining pore proportions and oxide proportions in different regions of the coating in real time. Based upon a plurality of captured individual images of the coating, average values of the pore proportions and the oxide proportions in the surface of the coating are calculated in real time for use in performing the quality assessment.

22 Claims, 5 Drawing Sheets

(51) Int. Cl.
*G01N 21/88* (2006.01)
*G01N 15/08* (2006.01)
*G01N 21/84* (2006.01)

(56) References Cited

U.S. PATENT DOCUMENTS

| | | | |
|---|---|---|---|
| 2013/0086960 A1* | 4/2013 | Hoshino | C23C 2/26 72/47 |
| 2014/0220487 A1* | 8/2014 | Kamae | G03G 9/1131 430/111.35 |
| 2015/0354058 A1* | 12/2015 | Morinaga | C23C 4/18 428/141 |
| 2016/0002110 A1* | 1/2016 | Izumi | C04B 35/45 428/332 |
| 2016/0096775 A1* | 4/2016 | Izumi | C04B 41/009 428/336 |
| 2016/0221078 A1* | 8/2016 | Koshita | B22F 3/1137 |
| 2016/0271908 A1* | 9/2016 | Izumi | C04B 38/0006 |
| 2017/0161886 A1* | 6/2017 | Shibayama | B23Q 17/24 |
| 2017/0281349 A1* | 10/2017 | Sakamoto | A61L 27/047 |
| 2018/0025486 A1* | 1/2018 | Shibayama | G01C 21/00 |
| 2018/0281037 A1* | 10/2018 | Higashida | B21B 25/02 |
| 2019/0036112 A1* | 1/2019 | Aida | H01M 4/366 |
| 2019/0106783 A1* | 4/2019 | Furuya | C23C 14/3414 |

OTHER PUBLICATIONS

Bobzin, K. et al., "Thermal spraying of cylinder bores with the Plasma Transferred Wire Arc process", Surface & Coatings Technology, vol. 202, pp. 4438-4443, Published Jun. 15, 2008.

Kim, Jaeick et al., "Deposition of Workability-Enhancing Disposable Thick Fe Deposits on Fe—Si Alloy Sheets Using Thermal and Kinetic Spray Processes", Journal of Thermal Spray Technology, vol. 24(3), pp. 318-327, Published Nov. 8, 2014.

Lekatou, A. et al., "A comparative study on the microstructure and surface property evaluation of coatings produced from nanostructured and conventional WC-Co powders HVOF-sprayed on Al7075"; Surface & Coatings Technology, vol. 276, pp. 539-556, Published Jun. 14, 2015.

Poirier, D. et al., "Thermal Cycling Assessment of Steel-Based Thermal Barrier Coatings for Al Protection", Journal of Thermal Spray Technology, vol. 24(1-2), pp. 175-184, Published Nov. 20, 2014.

Rezvani Rad, M. et al., "Stress analysis of thermal barrier coating system subjected to out-of-phase thermo-mechanical loadings considering roughness and porosity effect", Surface & Coatings Technology, vol. 262, pp. 77-86, Published Dec. 16, 2014.

* cited by examiner

METHOD AND DEVICE FOR ASSESSING THE QUALITY OF COATED SURFACES

CROSS-REFERENCE

The present application claims priority to European patent application serial number 17 171 668.1 filed on May 18, 2017, the contents of which are incorporated fully herein by reference.

TECHNICAL FIELD

The present disclosure relates to a method and a device for assessing the quality of coated surfaces. Such a method and/or such a device may be used, e.g., to perform a pore measurement and an oxide measurement of coated surfaces, such as, for example, of cylinder bores (cylinder bearing surfaces), e.g., of internal combustion engines.

BACKGROUND ART

Cylinder blocks (engine blocks), e.g., of internal combustion engines, are typically manufactured as a cast component. The inner surfaces of cylinders are directly manufactured in the casting process and usually do not fulfill (satisfy) geometric requirements and/or the requirements, with respect to the surface properties, placed on a cylinder bore, on or in which a piston will slide during operation, e.g., of the internal combustion engine.

For this reason, either cylinder liners, whose inner surfaces already correspond to the requirements or are appropriately processed after insertion, are inserted into the cylinders, or coatings are applied onto the inner surfaces of the cylinders. Such coatings may be applied, for example, using a thermally-sprayed coating method.

Known methods for applying thermal spray coatings include, for example, the Plasma Transferred Wire Arc method ("PTWA" method), the Electric Arc Wire Spray method ("EAWS" method) and the GROB® Thermal Spraying method ("GTS" method, which comprises the Rotating Single Wire ("RSW") method and the Atmospheric Plasma Spray "APS2" method). In the latter, one end of an automatically-supplied wire forms an anode; a plasma beam emanating from a cathode impinges on the end of the wire thereby causing the end of the wire to melt. The melted wire material (e.g., iron (Fe) or an iron-containing metal material) is then atomized by a transport gas mixture and accelerated toward the cylinder bore (e.g., an aluminum alloy structure) to be coated. The metal particles entrained in the transport gas mixture are thus applied onto the cylinder bore (with deformation of the particles) and form the coating that optionally may be post-processed, e.g., by honing or by alternative finish-processing methods.

In series production using such thermally sprayed coatings, as well as in the development thereof, quality control is highly important. The quality of a sprayed coating has been determined in the past by measuring a set of coating properties that are analyzed in order to evaluate the quality of the sprayed coating. For this purpose, depending on the requirements of the evaluation method, polished specimens are produced in three spatial planes, which are subsequently evaluated using an optical (light) microscope. In most cases, the optical (light) microscope is equipped with a camera that captures (photographs) individual views as image data. These images (image data) have been analyzed using known image-processing programs in order to perform the analysis and evaluation of the coating properties.

Two important properties for evaluating the quality of a thermally applied coating, such as a coating applied according to the GTS method, are the proportion or ratio of pores (pore proportion) and the proportion or ratio of oxides (oxide proportion) in the coating.

Pores are cavities in a material and/or are recesses or openings with respect to the surface of a material. A differentiation is to be made between micro-, meso-, and macropores. In the present disclosure, the pore proportion of micropores (e.g., pores in the range of 1-5 microns) is preferably determined. The cavities/pores emerge as recesses after the removal of one or more layers that lie on top of the cavities/pores. The pore proportion therefore determines, inter alia, the oil retention volume of the surface of the cylinder bore. The amount of oil that can be retained on the surface of the cylinder bore is relevant to (contributes to determining) the friction properties of the surface.

In the present disclosure, the oxides are usually metal oxides, which result when a metal (e.g., iron (Fe) in the thermally-applied coating material) reacts with oxygen or another oxidizing agent. The metal oxides are also relevant, similar to graphite, to (contribute to determining) the friction properties of the surface.

Pore- and oxide-proportions within a region having homogeneous layer properties, i.e., a region in which the coating has been applied with nearly constant process parameters and environmental parameters, are preferably analyzed. In the case of a coated cylinder bore, a region of the coating that lies on essentially the same circumference circle about (surrounding, encircling) the longitudinal axis of the cylinder is essentially homogeneous. Depending on the manufacturing technology, differences in the coating can arise, in particular at different longitudinal positions of a cylinder.

SUMMARY OF THE INVENTION

Since the pore proportions and the oxide proportions can vary greatly even within a region having homogeneous layer properties, a statistical validation and/or analysis is preferably performed in order to determine whether the quality of the surface coating satisfies the requirements for the particular usage. More particularly, value pairs, each having a pore proportion and an oxide proportion, are generated from a variety of (image) sections that are different from one another, preferably from different individual images, and average values of the value pairs are generated. The (image) sections are preferably captured at various locations within a region having homogeneous layer properties.

Thus, one aspect of the present teachings concerns, e.g., a method and a device that are capable of quickly and/or simply carrying out a pore measurement and an oxide measurement for a quality assessment of a coating.

In some embodiments of the present teachings, an image sequence (e.g., a video captured at a frame rate that is preferably constant) having individual images of different regions of a surface of a component is captured. Each of the different regions preferably includes (encompasses) a thermally applied coating having pore regions and oxide regions of the surface. The captured individual images (of the video), or partial regions of each captured individual image, are processed in real time (as a live image, online, live preview or the like), in order to generate value pairs for a plurality of (image) analysis regions from one or preferably a plurality of the individual captured images. These value pairs can then be stored in a storage unit. The value pairs directly (in real time, online, immediately after capture of the images) indicate (represent, specify) the pore content (proportion) and the oxide content (proportion) of within the portions of the coating captured in the respective individual images or the pore content (proportion) and the oxide content (proportion) are directly derivable from the value pairs.

In some embodiments of the present teachings, there is no intermediate or permanent storage of the image sequence (of the video), thereby minimizing data storage requirements. That is, after the value pair for a particular individual image is calculated and stored, the individual image is discarded (not stored). Average values for the pore proportion (content) and the oxide proportion (content) of the surface of the coating material can then be calculated from the stored value pairs, which can also be updated in real time (online). Both values of each value pair are thus preferably generated substantially at the same time or simultaneously.

In some embodiments of the present teachings, each of the value pairs may be directly or immediately (i.e., in real time, online, in or as a live preview) displayed (visually displayed) in the same live (preview) image (captured individual image), from which the value pair originates. That is, the first and second values optionally may be displayed simultaneously in the live image (captured individual image), from which the values were generated.

Such a method provides the following advantages. First, it is possible to directly or immediately visual monitor the value pairs that will be stored. Second, after the average values have been determined for a plurality of individual images, one image, from among a plurality of individual images, which has a pore proportion and/or an oxide proportion that best corresponds to one or both average values or that comes close to these, can be located (identified, selected) in the simplest manner. This selected image may then be optionally linked to, or stored with, the stored values and average values as a reference image, e.g., for further visual evaluation at a later time.

In the above-described embodiment, in which the captured individual images are not stored together with the value pair thereof (i.e. in an embodiment, in which the captured individual images are discarded after calculating the value pair thereof), the method may then further involve, after calculation of an average value of the first value and/or an average value of the second value, capturing additional (new) individual images of the surface of the coating and then selecting the representative image from the newly-captured images based upon the average value(s). The representative image may be selected by searching among the newly-captured individual images according to appropriate criteria, such as proximity of the first average value to the first value of each newly-captured individual image, proximity of the second average value to the second value of each newly-captured individual image, or proximity of the first and second average values to the first and second values of each newly-captured individual image.

In an alternative embodiment, the captured individual images are stored together with the value pair thereof. In such an embodiment, the representative image may be selected from among the stored individual images by selecting one of the stored individual images that has a value pair that closely represents the average values of all of the captured individual images. Similar to the preceding embodiment, the representative image can be selected by searching among the stored individual images according to the above-mentioned criteria, such as proximity of the first average value to the first value of each stored individual image, proximity of the second average value to the second value of each stored individual image, or proximity of the first and second average values to the first and second values of each stored individual image.

In some embodiments of the present teachings, the to-be-stored value pairs may be manually selected using displayed live images and/or live value pairs, or the to-be-stored value pairs can also be selected automatically according to a program executed by the image processing device. The trigger for an automatic storing or acquisition of the current values in a table (memory) can be, e.g., (i) the identification (recognition) of a new analysis region that differs from the previous analysis region, (ii) expiration of a time interval, etc.

In some embodiments of the present teachings, pore regions and oxide regions may be differentiated (e.g., marked, visually differentiable, etc.) in a manner that they are distinguishable from each other (e.g., in the image and/or as different stored values representing the captured image). In such an embodiment, the number of pixels (number of image points or image elements) that are respectively identified (e.g., marked) as pore regions and as oxide regions can be easily calculated. In addition, the size of individual pore regions and oxide regions can also be estimated by, for example, identifying adjacent pixels having identical markings, labels, etc. as a contiguous region. The size of each individual pore region and oxide region can be estimated from the number of pixels that form such a contiguous region.

The measured values of a region having approximately identical pore and oxide properties may be preferably stored in a table (computer memory) and/or may be automatically evaluated statistically over the number of measurements. Such an evaluation may include, for example, calculating the average values and/or the standard deviations and/or the maximum and minimum values of the first and second values, and the results can be automatically output (e.g., stored, transmitted to another device, and/or displayed).

In some embodiments of the present teachings, the quality control process can be performed in a manner such that it is ensured that the pore proportions and/or oxide proportions of the coating fall within prescribed limit values (prescribed ranges). For example, an error signal (product defect alert) can be generated if the pore proportions and/or the oxide proportions of the coating fall outside the prescribed limit values (ranges), or if their standard deviation exceeds a prescribed value such that the average value is not statistically validated over the number of measurements.

By (preferably automatically) generating the value pairs, calculating the average values of the value pairs, and optionally linking these data to a reference image region or reference image using a computer, time can be saved in quality control process as compared to conventional methods. Due to this time savings, the reaction time in the manufacturing process can also be reduced in the event of a negative quality assessment, whereby rejects and/or post-processing can be reduced. Due to the processing (and optional display as a live preview) in real time, the relevant data can be directly generated, optionally without storing the individual images used to generate the data, thereby reducing computing power and storage requirements. Furthermore, the error rate in the quality is reduced since the calculated values are automatically acquired and used as the basis for the analysis.

In embodiments of the present teachings in which the measurement results are store in or with or linked to the image data of a corresponding reference image or image region, a loss of the association between the calculated values (average value pair) and a representative image of the coating can be avoided.

In some embodiments of the present teachings, short calculation times and a minimal delay of the visualization can be ensured by using parallelization and vectorization.

Additional objects, embodiments, features and advantages of the present teachings will become apparent from the following description of detailed embodiments and from the claims with reference to the figures.

DETAILED DESCRIPTION OF THE EMBODIMENTS

The below-described methods and devices according to embodiments of the present teachings may be preferably used to perform quality monitoring (quality control) of surfaces, which preferably have a coating formed thereon, by measuring pore proportions and oxide proportions in (at, on) a coated surface of a component.

Figure 1:
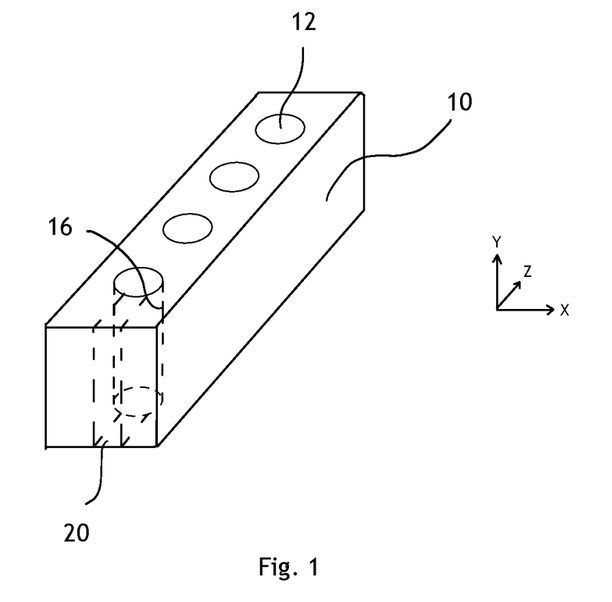
FIG. 1 shows an exemplary section of a cylinder block.

Such a component is, for example, a cylinder block 10, as is sectionally depicted in an exemplary manner in FIG. 1. Such a cylinder block 10 includes, in particular, one or more cylinders 12. As was described in the introduction above, after the casting of such a cylinder block 10, a (each) cylinder bore (cylinder bearing surface, cylinder sliding surface) is treated, for example, by applying a coating 14 (see FIG. 2) onto the inner surface 16 of the cylinder 12. In the present example, the coating is preferably made of (comprises) iron (Fe) or an iron-containing metal material (e.g., iron alloy) that is preferably applied according to the above-mentioned GTS method. The quality of this coating is determined, inter alia, by the proportion of pores and the proportion of oxides in (at, on) the surface. The proportion of pores and the proportion of oxides are therefore measured for quality assurance.

Figure 2:
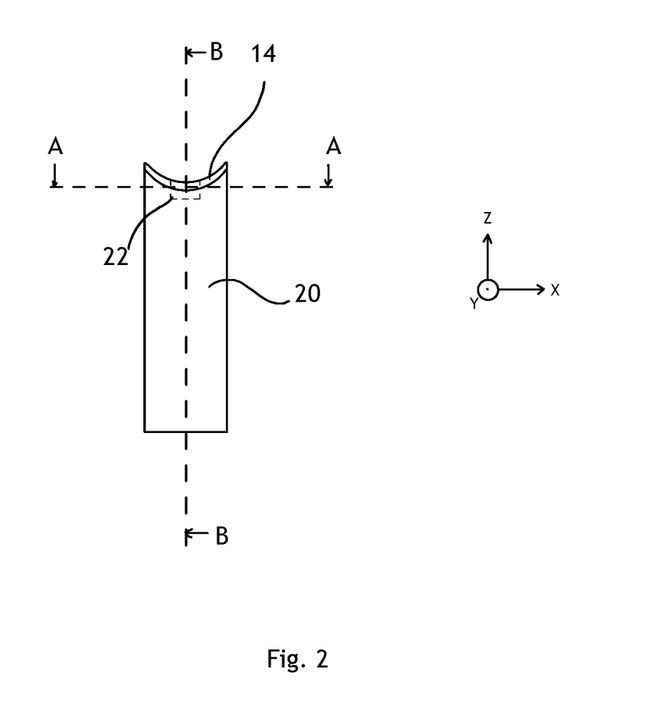
FIG. 2 shows an exemplary view of a test specimen.
Figure 3:
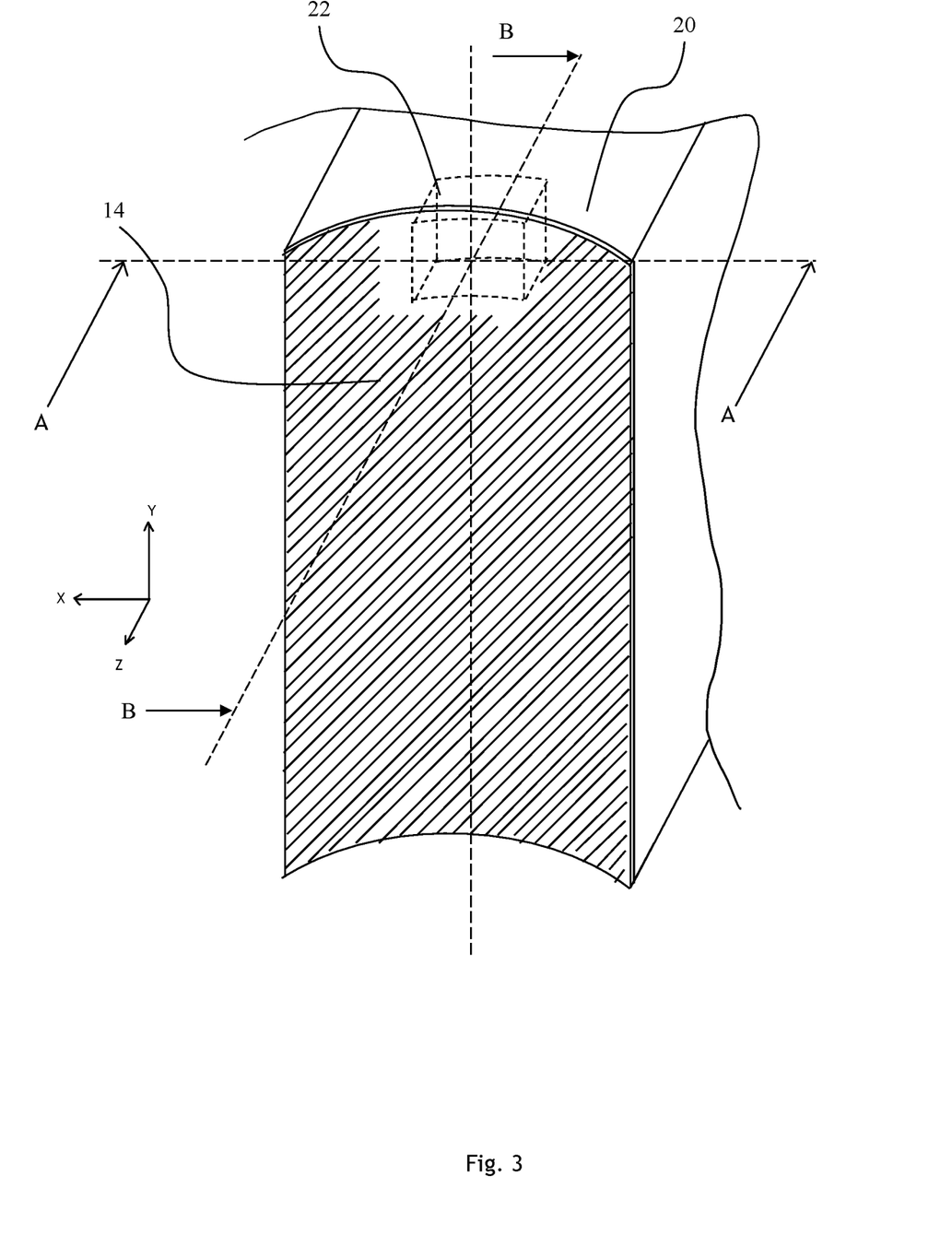
FIG. 3 shows a perspective partial view of the test specimen.

In order to be able to advantageously perform a pore measurement and an oxide measurement, it is preferred to first make a polished specimen 18 (see FIG. 4) of the surface (coating) to be measured. For this purpose, a test specimen 20, which is depicted in FIGS. 2 and 3, is first cut out from the cylinder block 10 (see dashed lines in FIG. 1). Polished specimens 18 are subsequently made from the test specimen 20. The polished specimens 18 are preferably prepared from cubic parts or cuboid parts (see, for example, cuboid part 22 in FIGS. 2 and 3) cut out from the test specimen 20. The surface, which comprises the coating, to be measured of the cubic parts or cuboid parts is prepared for the measurement by grinding and polishing. For this purpose, each cubic part or cuboid part 22 is cast (embedded, set) in a synthetic resin block (embedding medium; not shown) for better handling such that the surface to be measured is exposed on a top side of the synthetic resin block. Cut marks, for example, in the thus-exposed surface are removed by the above-mentioned grinding and polishing with (using) different grain sizes and the surface to be measured is made smooth in a pristine form. The surface to be measured is, for example, either a cross-section in the plane of the drawing of FIG. 2 (X-Z plane) or a cross-section perpendicular thereto along the line A-A (X-Y plane) or the line B-B (Y-Z plane) as depicted in FIG. 2. For example, each cubic- or cuboid-part 22 has an edge length in the range of 1 cm to 4 cm.

Figure 4:
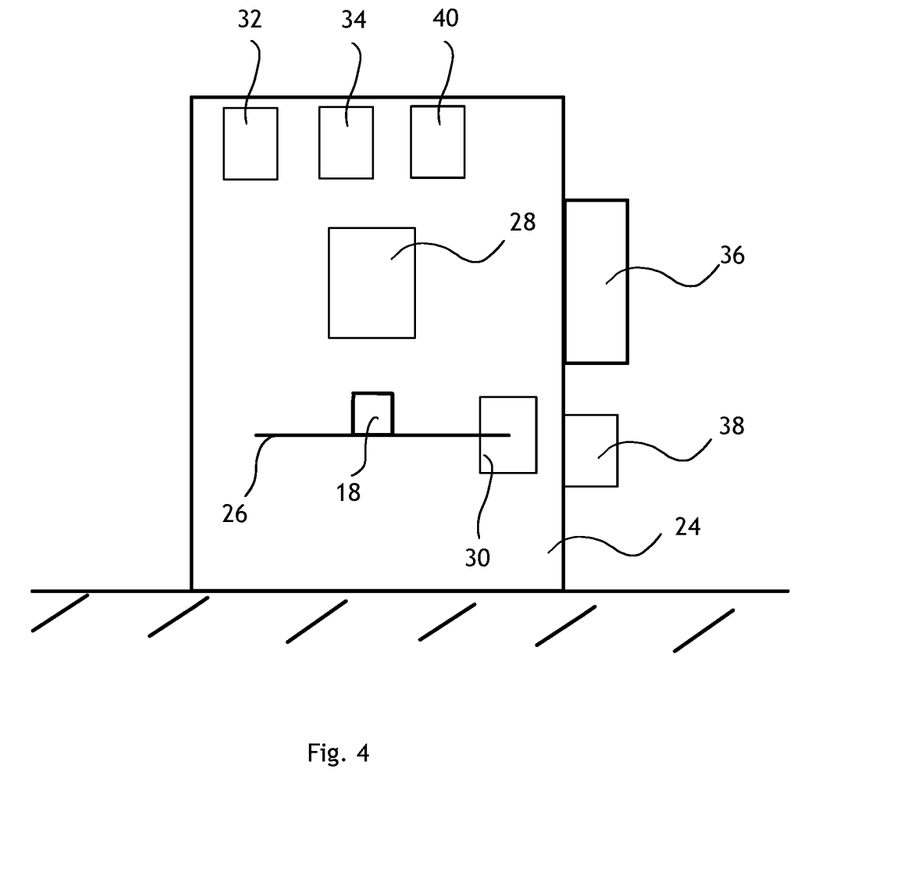
FIG. 4 shows an exemplary depiction of a device according to a first embodiment of the present teachings.

FIG. 4 shows an exemplary device 24 for performing the pore- and oxide-measurement according to the first embodiment. In the present first embodiment of the present teachings, the device 24 includes a measurement table 26 on which the polished specimen 18 can preferably be placed in or at a predetermined position.

An image capture device 28 is provided over the measurement table 26. An image sequence that comprises individual images, i.e., a video, can be captured (photographed) using the image capture device 28. The optics (lens) of the image capture device 28 are disposed and configured such that the surface to be measured of the polished specimen 18, which in the depicted example is facing the image capture device, can be captured (photographed). In particular, the image capture device 28 can be focused on the surface to be measured. Furthermore, the measurement table 26 can be moved relative to the image capture device 28, or the image capture device 28 can be moved relative to the measurement table 26. For example, the measurement table 26 can be moved horizontally or vertically via a drive (motor) 30 (for example, a manually or electronically operable linear actuator, such as, e.g., a linear motor).

The image capture device 28 preferably includes, for example, an electronic optical (light) microscope having various magnification optics (lenses) and a camera (e.g., a CCD-camera or a CMOS camera) that generates digital image data. The image capture device 28 can be focused manually or automatically on the surface to be measured. The image capture device 28 is further configured such that an image sequence having individual images, i.e., a video, can be captured and transmitted in real time to a data processing unit 32. As will be further described below, generally speaking, the data processing unit 32 may include, e.g., a computing unit having one or more central processing units (CPUs), such as microprocessors, memory (e.g., RAM, EEPROM, flash, or the like), etc.

The data processing unit 32 is configured to process in real time the image sequence, which contains individual images, obtained from the image capture device 28, as will be described in more detail below.

Furthermore, the device 24 includes a storage unit (computer memory, e.g., RAM, EEPROM, flash, or the like) 34 in which data generated by the data processing unit 32 can be stored.

Furthermore, a display device 36, e.g., in the form of a display (screen), an operator input unit 38, and an output unit 40 are also provided in the present embodiment. Using the display device 36, data generated in the data processing unit 32, the images and image sequences captured using the image capture device 28 and data stored in the storage unit 34, can be visually output (displayed). Using the operator input unit 38 (e.g., keyboard, keypad, computer mouse, touch screen, etc.), commands for adjusting the measurement table 26, commands for controlling the image capture device 28 and the data processing unit 32, and commands for controlling the display device 36 can be entered by an operator. The output unit 40 (e.g., USB port, serial port, wireless communication port, etc.) is configured to output (convey) data generated in the data processing unit 32 and/or data stored in the storage unit 34 to further (external) devices.

Each of the individual images captured by the image capture device 28 is transmitted to the data processing unit 32 directly after its capture. This transmission of data can occur in a digital manner and/or in an analog manner, wherein in the case of an analog transmission, an analog-digital conversion, for example, is performed in the data processing unit 32.

To identify (recognize, differentiate) the pore regions and the oxide regions in each individual image, the data processing unit 32 is further adapted (configured, programmed, etc.) to subject a processed region of the digitized individual image, which may comprise the entire individual image or only a portion thereof, to a thresholding (image processing) method to perform segmentation (image segmentation) of each individual image into pore regions and oxide regions, e.g., using a program stored in the data processing unit 32 or in the storage unit 34.

Using such a thresholding (image processing) method, the pixels of the processed region of the individual image are classified into different types of structures depending on (in accordance with), for example, their gray values. The gray value of a pixel is its pure brightness value. As will be further explained below, in some embodiments of the present teachings, further color information is therefore not taken into account in the processing and/or need not even captured in the first place, in order to reduce processing requirements.

In the present embodiment, black/dark pixels are classified as pixels that represent pores, gray pixels that are lighter than the pixels of the pores are classified as pixels that represent oxides, and light gray pixels that are lighter than the pixels of the oxides are classified as pixels that represent the matrix of the base (coating) material (e.g., the iron (Fe) matrix that is coated onto an aluminum cylinder block). In other words, each pixel may be assigned one of three labels or markings (i.e. pore, oxide or Fe matrix) according to its gray value.

Because no additional appreciable or relevant classes of structures are present in the coating material to be measured (i.e. other than the three, above-mentioned types of structures (namely, pores, oxides, and Fe matrix)), and because not all pixels of a class (pores, oxides, or Fe matrix) have the same gray value owing to interference signals or level differences, gray-value ranges may be set to perform this pixel classification using the thresholding method. Then, each pixel is associated (identified) with the respective associated class of pixels (i.e. pores, oxides or Fe matrix) using the gray value ranges sets for the different classes (types of structures).

In the present embodiment, to perform the (image) segmentation using a thresholding method, at least two threshold values S1 and S2 are set for the gray values of pixels. By using the at least two threshold values S1 and S2, the pixels of each individual image can be respectively associated with one of the three regions (pore-, oxide-, and Fe matrix-region) based upon the particular gray value of each pixel, as will be explained further below.

The setting of the threshold values S1 and S2 can be input (performed) in advance, i.e., stored in the storage unit 34, or can be input by an operator via the operator input unit 38.

Figure 5:
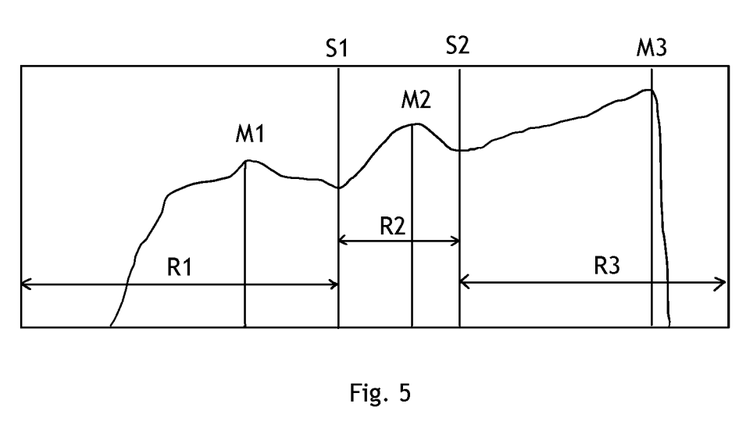
FIG. 5 shows an exemplary depiction of a histogram of pixels from a captured image of a coating of a component to be assessed.

In the alternative, the threshold values S1 and S2 can be determined by an operator or software (program), for example, as follows: FIG. 5 shows an exemplary gray-value histogram of one individual image of a coating having pore regions and oxide regions. The analysis region in FIG. 5 comprises only the coating composed of the iron (Fe) containing material; i.e. the analysis region in FIG. 5 does not include the synthetic-resin embedding material or the aluminum structure of the cylinder block 10. The prevalence of each individual gray value is indicated in the histogram in the vertical direction (i.e. greater numbers of gray values are indicated as higher values in the vertical direction), and the gray values becomes lighter from left (i.e. relatively dark/black) to right (i.e. relatively light/white).

A first threshold value S1 and a second threshold value S2 respectively delimit the three gray-value ranges R1, R2, R3 and are selected as follows. In the relatively dark gray-value range (left half of the histogram), two relative maxima M1, M2 distinctively stand out. The gray-value range R1 for pixels that represent pores is set around the first relative maximum M1. This region R1 is delimited to the left by the left edge (where the gray value equals black) of the histogram and to the right by the first threshold value S1. Starting from the first relative maximum M1, the first threshold value S1 is disposed at a certain distance in the lighter direction (i.e., to the right) and/or is located at a (or the) relative minimum between the first relative maximum M1 and the second (the next-lightest) relative maximum M2. The gray-value range R2 for the pixels that represent oxides thus falls directly adjacent ("in the lighter direction" means to the right in FIG. 5) to the gray-value range R1 for the pixels that represent pores. The above-described first threshold value S1 that corresponds to the gray value of the lightest pixel of the pores also describes the darkest gray value of precisely the pixels that are no longer to be considered as oxide. Similar to the threshold value S1, the second threshold value S2 also is disposed at a certain distance in the lighter direction with respect to the maximum M2 and/or is located at a (or the) relative minimum between the maximum M2 and a third maximum M3 for the lighter pixels of the Fe matrix of the coating. The second threshold value S2 defines the transition into the gray values of the pixels of the Fe matrix of the coating that thus fall in the gray-value range R3.

Alternatively, "Otsu's method", which is a known thresholding method, may be utilized with the present teachings to perform an automatic recognition and calculation of the components of a pattern-based histogram. In the present embodiment, a thresholding method preferably recognizes overlaid, similar gray-value distributions of the pore-, oxide-, and Fe-matrix-regions according to Otsu's method and calculates the threshold values as boundaries between these regions (classes).

In the present first embodiment, to perform the oxide measurement and the pore measurement of an individual image, the entire (captured) individual image is set as the processed region (i.e. the region of the coating to be analyzed). In the data processing unit 32, each pixel (image point or image element) of the particular individual image is associated with one of the three classes (pores, oxides, or Fe matrix) based on the pre-set first and second threshold values (boundaries) S1, S2 and is marked with (labelled as) the corresponding class or with a marker (label) corresponding to the class. For example, each pixel of a class may be depicted in a predetermined color. For example, the pixels classified (labelled) as pores can be marked (visually depicted as) red and the pixels classified (labelled) as oxides can be marked (visually depicted as) blue. The pixels of the Fe matrix of the coating need not be taken into consideration for a pore- and oxide-measurement.

The data processing unit 32 is further adapted (configured, programmed, etc.) to calculate the number of pixels per class, i.e., the number of pixels labelled as pores (e.g., marked/depicted red) and the number of pixels labelled as oxides (e.g., marked/depicted blue), in an analysis region that corresponds to the processed region or falls within it, and to output these numbers and/or to store them in the storage unit 34 or a RAM storage. The thus-determined values for pixels of a class in the analysis region, i.e., pixels that represent pore regions and pixels that represent oxide regions, can each be considered in relation to the total number of pixels that are present in the analysis region in order to obtain a relative percentage (proportion) of pixels that represent pore regions and/or a relative percentage (proportion) of oxide regions in the analysis region.

In the present first embodiment, the analysis region is selected within the processed region that comprises the entire individual image. Therefore, the entire individual image captured by the image capture device 28, which individual image can also show, in a certain area, a cross-section through the coated region of the component, is not processed and evaluated; rather, only a particular analysis region thereof is not processed and evaluated. In the analysis region of the individual image, exclusively the surface of the coating is preferably depicted/present.

The position and size of the analysis region can be set in advance (at a known position of the coating) by an operator, e.g., it can be manually adjusted using the live image. In the alternative, the analysis region can be automatically calculated, for example, based on the resolution used or based on a focusing range that can depend on a curvature of the surface to be measured, or by automatic recognition of relevant areas, for example, using a threshold value method (thresholding method). The analysis region can be a subsection (a portion) of an individual image or it can be the entire individual image (for example, if only the surface of the coating is captured). The analysis region is preferably set by a sampling frame 54 (see FIG. 6).

Figure 6:
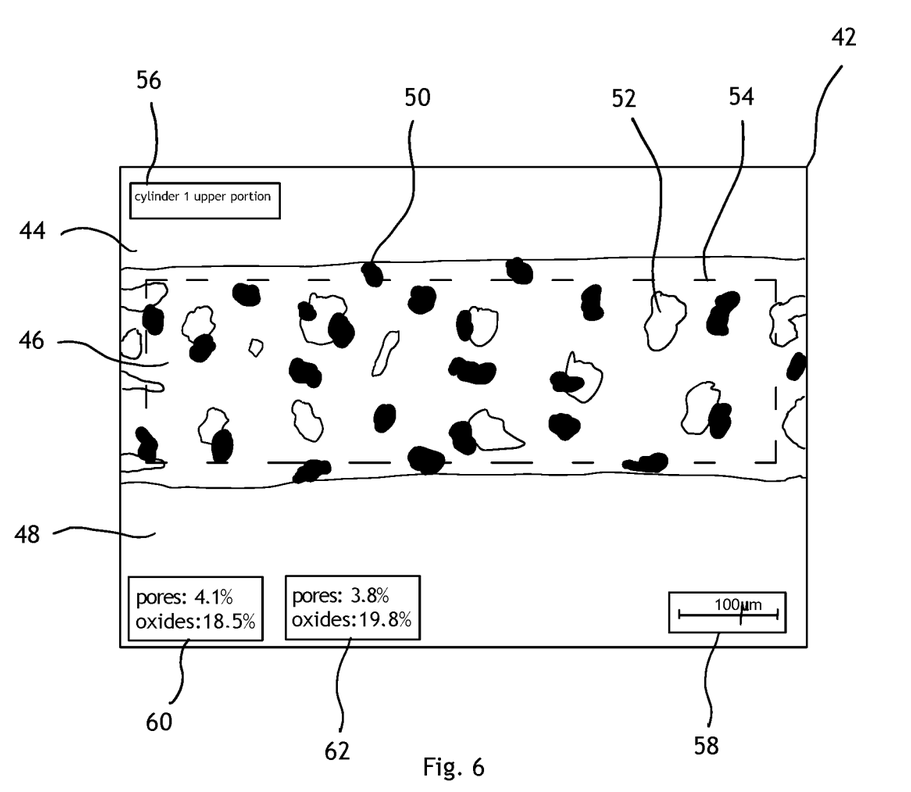
FIG. 6 shows an exemplary depiction of a processed individual image and its display according to the first embodiment of the present teachings.

To determine the pore ratio (proportion) and the oxide ratio (proportion) in (on, at) the surface of the coating, the sampling frame 54, i.e. the analysis region, is selected such that, when calculating the first and second values, at most only those regions of the individual image of the polished specimen are taken into consideration that show the coating, i.e. the analysis region encompasses exclusively a portion of the coating and does not cover other structures, such as the aluminum structure of the cylinder block or the resin embedding the polished specimen 18. In this way, a distortion of the calculated values due to pore- and oxide-regions or regions having similar gray values in the cross-section of the body of the coated component can be avoided. Since each pixel of an individual image that is associated with one of the classes essentially (approximately) corresponds to a corresponding real region of the polished specimen, the calculated values also approximately coincide with real (actual) values.

The first and second values, which have been calculated in this manner for a single individual image or an analysis region thereof, can then be stored as a value pair in the storage unit 34.

The image sequence currently captured using the image capture device 28 is displayed to a user on the display device 36 (e.g., a computer screen). That is, the pixels that represent the pore regions and the pixels that represent the oxide regions are displayed (preferably simultaneously displayed) in the respective colors (e.g., red and blue) associated therewith. In particular, the individual image, which is currently captured by the image capture device 28, of the image sequence is processed in real time in the data processing unit 32 such that the individual image is displayed live (in a live image of the image capture device 28) on the display device 36 with the pixels segmented (color coded or colored), e.g., according to the above-described thresholding method.

FIG. 6 shows an exemplary screen view 42 as it is depicted as a live image on the display device 36 during operation of the device 24. The term "live image" means that, as indicated above, each image captured by the image capture device 28 is depicted in its already processed (segmented) form nearly simultaneously with its capture.

The region, which is depicted in the individual image (live image) (FIG. 6), of a polished specimen 18 is produced, for example, by grinding the cube, which is embedded in the embedding medium (resin), perpendicular to the plane of the drawing along the line B-B (Y-Z plane) in FIG. 2. In the depiction of FIG. 6, three regions 44, 46, 48 disposed vertically one-over-the-other are present. More particularly, the central region 46 depicts a cross-sectional view of (exclusively) the coating 14, the upper region 44 depicts in an exemplary manner a cross-sectional view through the coated region of the test specimen 20, i.e., of a part of the coated wall of the cylinder 12, and the lower region 48 depicts in an exemplary manner a cross-sectional view through the embedding material (resin) of the polished specimen 18.

The cross-sectional view 44 of the coated region (not of the coating itself) of the test specimen 20 and the cross-sectional view of the embedding material are depicted in a simplified manner without any structure. In the central region 46, i.e. in the cross-sectional view of the coating, the pore regions 50 are depicted, for example, red (in FIG. 6, the pore regions 50 are filled in with black for better differentiation) and the oxide regions 52 are depicted, for example, blue (in FIG. 6, the oxide regions 52 are shown with a black edge and white interior for better differentiation).

Furthermore, the above-described sampling frame 54 for selecting the analysis region to be analyzed also is depicted in FIG. 6. The size and position of the sampling frame 54 can be set, for example, via the operator input unit 38, or automatically using software executed by the data processing unit 32. Furthermore, a name field 56, in which a name of the image sequence or measurement series entered by the operator or automatically generated is specified, and a scale field 58, in which the currently used scale is displayed, are preferably provided.

The proportions (ratios) of pores and oxides (number of red or blue pixels that have been identified as pores or oxides, respectively, in relation to the total number of pixels in the sampling frame 54) inside the sampling frame 54, i.e., present in the analysis region, are preferably displayed in a (current) value-display region 60. A segmented individual image is thus displayed on the display device 36 in real time (as a live preview) together with the ratio values (value pairs) corresponding to (calculated from) the individual image.

The data processing unit 32 is further adapted (configured, programmed, etc.) to store the currently calculated value pair of the first value and the second value in the storage unit 34, e.g., in a table, either automatically (for example, in a time-dependent manner or after detection (recognition) of predetermined (minimum) changes) or on request by an operator via the operator input unit 38. Optionally, the stored values, i.e., the table, can be displayed in a corresponding display region in the screen view.

For example, after changing the position of the polished specimen 18 relative to the image capture device 28 and the associated change of the captured region of the polished specimen 18, and/or after changing the size and/or position of the sampling frame 54 and the associated change of the analysis region to be analyzed in the individual image, another value pair comprised of another first value and another second value, which is again currently calculated and displayed in the screen view 42 or display device 36, is stored in the storage unit 34 in the same table either automatically or on request by an operator via the operator input unit 38. Further value pairs can be obtained and stored in the same way.

The data processing unit 32 is preferably further adapted (configured, programmed, etc.) to analyze the values stored in the table. In particular a first average value (or mean value) of the first values and a second average value (or mean value) of the second values are preferably calculated and stored and preferably displayed in an average-value-display region (62) in the screen view 42. Here, the average value can be displayed starting from the first value pair and can then be updated after each additional value pair is stored in the storage unit 34, e.g., after additional analysis regions are processed to calculate additional first and second values. Furthermore, other values, such as a standard deviation and/or maximum and minimum values of the first and second values, also can be calculated, stored, and optionally displayed.

After completion of a measurement series, i.e., after the termination of the storing of value pairs, the first and second average values determined for this measurement series are available. The data processing unit 32 is further adapted (configured, programmed, etc.) such that a reference image can be generated (selected) either automatically or by an operator. For this purpose, the position of the polished specimen 18 relative to the image capture device 28 is changed, either manually or automatically, and/or the size and/or position of the sampling frame 54 and the associated change of the analysis range to be analyzed is/are changed, either manually or automatically, in order to seek (locate) a currently-measured first value, which is close to or coincides with the calculated first average value. When an image region defined by the corresponding sampling frame, i.e., the analysis region of the individual image, having such a currently-measured first value is found (located), it is stored as a reference image (representative image) of the coating.

Alternatively, an image region, which has a currently-measured second value that is as close as possible to the second average value or which has both currently-measured first and second values that are as close as possible to the first and second average values, can be selected as the reference image (representative image) of the coating. A selection according to one of the other values, such as maximum value or similar, is also possible. Furthermore, the entire individual image corresponding to the analysis region, independent of whether the analysis region extends over the entire individual image or not, can also preferably be stored as the reference image.

The stored values (e.g., the first and second values of the reference image and the average first and second values of the set of individual images that were captured and processed as described above) are stored together with the reference image (for example, in a common directory or in the metadata of the reference image) and/or are linked to one another such that a later association of the data with the reference image can be ensured. Preferably, additional attributes such as the name of the image sequence or measurement series, etc. are stored with and/or otherwise linked to the reference image.

Using the device thus configured, the method depicted in FIG. 7 and described in the following can preferably be performed.

In first step S1, the polished specimen 18 is positioned by the operator (see circle with "B" in FIG. 7) with respect to the image capture device 28 so that the image capture device 28 can capture (digitally photograph) the surface of the polished specimen 18, in particular the region of the surface of the polished specimen 18 that represents a cross-section through the coating 14.

In second step S2, a process of capturing (photographing) an image sequence comprising a plurality of individual images using the image capture device 28 is started. Furthermore, the generated data (each of the image data) is transmitted to the data processing unit 32.

In third step S3, as each captured individual image is received in the data processing unit 32, the processed region of each captured individual image (in this embodiment, the entire image) is processed in real time with the capture, i.e., live or online. The segmentation (image segmentation) is performed in step S3 based on gray-value ranges such that pixels that represent the pore regions can be differentiated from pixels that represent the oxide regions, for example, according to different color markings thereof or by simply labelling each pixel as (e.g., by simply labelling a stored pixel value as simply one of) a pore region, an oxide region or Fe matrix based upon the gray value of the pixel.

Thus, a representative, non-limiting algorithm for performing this step may include (i) determining the gray value of each pixel, (ii) determining whether the gray value is greater (darker) than a first predetermined threshold value S1, (iii) if so, labelling the pixel as a pore region, (iv) if not, determining whether the gray value is less (lighter, more towards the right side) than a second predetermined threshold value S2, (v) if so, labeling the pixel as Fe matrix, and (vi) if not, labeling the pixel as oxide region.

Of course, the pixel labelling of third step S3 also may be performed in a variety of other ways, e.g., using known image segmentation methods, such as Otsu's methods.

In fourth step S4, each individual image processed in this manner is displayed in real time, i.e., live or as a live preview, on the display device 36 (see rectangle with "A" in FIG. 7), such that the processed individual images are displayed in sequence in real time with their capture.

In fifth step S5, the operator selects a first analysis region to be analyzed in an individual image using the operator input unit 38 by setting the sampling frame 54 in the screen view 42, while the screen view is continuously showing processed images. Furthermore, focusing is effected (performed) here either by the operator or automatically.

In the alternative, in fifth step S5, the selection of the first analysis region may be set automatically, e.g., by software executed by the data processing unit 32. A representative, non-limiting algorithm for automatically performing step S5 may include, e.g., moving the sampling frame 54 to a region where only the coating is present, which is determined, e.g. by a segmentation algorithm. Of course, the selection of the analysis region in step D5 may be performed in a variety of other ways, depending upon the application.

With the setting of the sampling frame 54, the data processing unit 32 continuously calculates with respect to each of the processed images, in sixth step S6, the ratio (proportion, percentage) of the pixels displayed inside the sampling frame 54 that represent pore regions to the total number of pixels inside the sampling frame 54 as a first value, and the ratio (proportion, percentage) of the pixels displayed inside the sampling frame 54 that represent oxide regions to the total number of pixels inside the sampling frame 54 as a second value. These first and second values (ratios) form a value pair.

A representative, non-limiting algorithm for performing step S6 may include (i) counting the number of pixels in the analysis region that have been labeled as pore regions, (ii) counting the number of pixels in the analysis region that have been labeled as oxide regions, (iii) counting the total number of pixels present in the analysis region, (iv) dividing the number of pixels in the analysis region that have been labeled as the pore regions by the total number of pixels in the analysis region and setting this value as the first value, and (v) dividing the number of pixels in the analysis region that have been labeled as the oxide regions by the total number of pixels in the analysis region and setting this value as the second value.

In the alternative, the sixth step S6 may be performed by simply performing the above steps (i) and (ii), such that the number of pixels in the analysis region that have been labeled as pore regions is set as the first value and the number of pixels in the analysis region that have been labeled as oxide regions is set as the second value.

Again, other algorithms for setting the first and second values may be utilized without limitations, as long as the first and second values represent or correspond to the amount or ratio of pore and oxide regions, respectively, in the analysis region.

In seventh step S7, the calculated first value and the calculated second value, and optionally corresponding average values, are displayed (preferably simultaneously displayed) together with the processed image using the display device 36.

Figure 7:
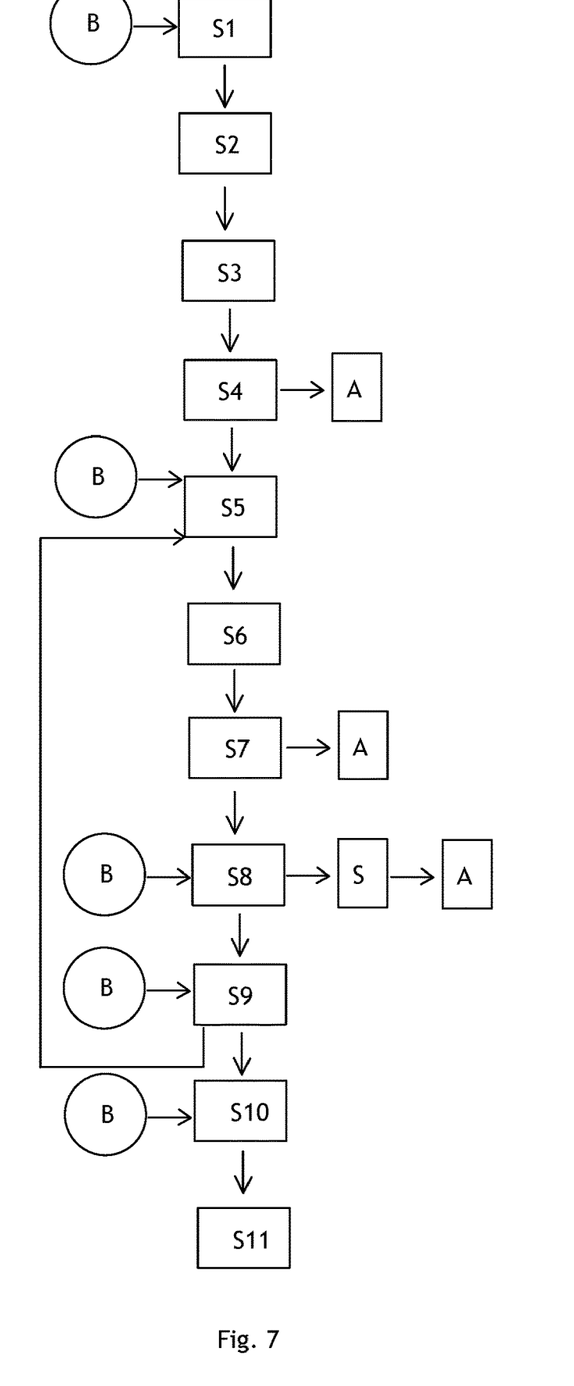
FIG. 7 shows an exemplary flow diagram for a method according to the first embodiment of the present teachings.

In eighth step S8, the calculated first value and the calculated second value are stored in the storage unit 34 when a command is entered (input) via the operator input unit 38 (see rectangle with "S" in FIG. 7). For all stored value pairs, a first average (arithmetic mean) value for the first values is calculated, stored, and displayed and a second average (arithmetic mean) value for the second values is calculated, stored, and displayed.

Representative, non-limiting algorithms for performing the eight step S8 include (i) summing the numerical values of all the stored first values and dividing this sum by the total number of stored first values and (ii) summing the numerical values of all the stored second values and dividing this sum by the total number of stored second values. In the alternative, step S8 may be performed by calculating a geometric mean, a harmonic mean, weighted arithmetic mean, etc., the values of each of which is intended to fall within the scope of "average value" according to the present teachings unless otherwise noted.

In ninth step S9, the position of the polished specimen 18 relative to the image capture device 28 and/or the position and/or the size of the sampling frame 54 is changed by an operator such that another analysis region, which differs from, and preferably does not overlap, the first analysis region, can be selected by the sampling frame 54.

With the change of the position of the polished specimen 18, the method returns to step S5. A region to be analyzed is thus selected once again (step S5). In the subsequent step S6, another first value and another second value (i.e., another value pair) are subsequently calculated and stored.

In the event that only the position and/or size of the selection frame 54 within the same captured individual image is changed, the process returns to step S6.

Steps S5 to S9 are carried out as often as required until in step S9 the operator enters an end command, for example, when the number of measurements required for a statistical evaluation is reached. In the alternative, the data processing unit 32 may automatically terminate the data collection steps when a predetermined number of measurements have been performed, e.g., when a predetermined number of first and second values (value pairs) has been stored.

In step S10, the position of the polished specimen 18 relative to the image capture device 28 is changed, either manually or automatically, and/or the position and/or size of the sampling frame 54 is changed, either manually or automatically, until the currently-measured first value for the analysis region selected using the sampling frame 54 is as close as possible to the calculated average value of the first values or is equal to it and/or until the currently-measured second value for the analysis region selected using the sampling frame 54 is as close as possible to the calculated average value of the second values or is equal to it.

A representative, non-limiting algorithm for performing step S10 may include (i) calculating the first value of the selected analysis region according to step S6, (ii) subtracting the calculated first value of the selected analysis region from the stored first average value to determine a difference value, (iii) if not zero, taking the absolute value of the difference value, (iv) comparing the difference value to a predetermined proximity value, (v) if the difference value is less than the predetermined proximity value (i.e. the calculated first value is at least "substantially equal" to the stored first average value), then setting the selected analysis region, or a portion of or the entire individual image containing the selected analysis region, as the reference image, and (vi) if the difference value is greater than the predetermined proximity value, then selecting a new analysis region, e.g., according to step S9. This algorithm may be modified to calculate the second value of the selected analysis region according to step S6, and subtract the calculated second value of the selected analysis region from the stored second average value to determine a difference value, followed by the above-described steps (iii)-(iv), in order to determine whether the calculated second value is at least substantially equal to the stored second average value. Herein, the term "substantially equal" may be understood as meaning, e.g., within 10% of the stored average value, more preferably within 5% of the stored average value, and even more preferably within 2% of the stored average value.

In step S11, the image region that is set (selected) as the reference image in step S10 is stored with the stored values (e.g., the value pair of the selected analysis region of the reference image and/or the first and second average values calculated in step S8) or is otherwise linked with the stored values. Thereafter, the method is ended.

In a particularly advantageous embodiment of the present teachings, when actual first and/or second values exceed or fall below predetermined limit values (ranges) for the average values or for individual values or calculated standard deviations or the like, an error signal can be output, thereby indicating that the test specimen 20 contains a defective or sub-standard coating.

Modifications of the above-described device and/or of the above-described method are described below which, if not described otherwise, can be combined individually or together with the features described with respect to the first embodiment or contained in the claims.

The second embodiment described in the following corresponds to the above-described first embodiment with the exception of the device features and method steps that are described differently.

If it is ensured that the environmental conditions remain nearly constant and the position and orientation of the polished specimens are accurately repeatable, then a fully automated measurement process can be realized (implemented) with some modifications. In this case, the display device can be omitted. In a device according to such a second embodiment, the measurement table 26 is movable electronically, i.e., controlled by the data processing unit 32, using a drive device 30 (for example, the linear actuator 30 is electrically driven). Furthermore, the image capture device 28 may preferably include an auto-focus function that is available in some known image capture software.

In this second embodiment of the present teachings, a polished specimen 18 is placed on the measurement table 26, for example, at a predetermined position. The measurement table 26 is subsequently moved under the control of the data processing unit 32 such that an image sequence of the surface to be measured of the polished specimen 18 can be captured using the image capture device 28. To determine the desired position, the data processing unit 32 can determine the actual (current) position of the polished specimen 18 from the image sequence captured using the image capture device 28 (for example, according to an image segmentation method) and can control the measurement table 26 such that a target position is reached. A search function can compensate for small position- and orientation-deviations of the coatings embedded in the polished specimen.

As in the first embodiment, after reaching the target position the segmentation (image segmentation) of the individual images is performed in real time to calculate the first and second values. An automated analysis of the histogram of the gray values of the pixels compensates for fluctuations of the illumination/brightness of the live image. The threshold values and thus the gray-value ranges can be determined automatically (for example using Otsu's method). If a maximum or a minimum shifts due to changed layer quality or boundary conditions, the software readjusts the gray threshold value(s) for the pores and/or the oxides.

To determine the analysis region to be measured within an individual image, i.e., to position the sampling frame 54 such that only the surface of the coating is measured, for example a further segmentation according to gray values can be performed that differentiates the cross-section through the coated surface (i.e. coated region of the component) from the coating itself. Alternatively, the polished specimens 18 and the positioning with respect to the image capture device 28 can be coordinated with each other such that the coating is always disposed at a predetermined position that corresponds to the position of the sampling frame 54.

With the setting of the sampling frame 54, the first value pair can be captured and stored. The polished specimen 18 is subsequently moved by the measurement table 26 such that the sampling frame captures another analysis region that differs from the first analysis region. For example, the measurement table can be moved along a predetermined path.

In a next step the next value pair is captured and stored. After a predetermined number of value pairs has been captured, corresponding average values are calculated. Subsequently the data processing unit 32 can move the measurement table 26 such that an analysis region is captured and the image region defined by it is stored, the first value of which analysis region is close to the first average value, and can store this selected analysis region as a reference image. The measurement data and calculated average values can be stored with the reference image or linked thereto.

Optionally, the data thus obtained (image region and associated measurement data) can be transferred via the output unit 40 to further systems and/or displayed using the display device.

Similar to the first embodiment, when the actual values exceed or fall below the prescribed limit values for the average values or for individual values or calculated standard deviations in the second embodiment, an error signal can be output.

The following further modifications, which can be combined with the above embodiments or the features described in the claims, are possible:

In the embodiments described above, the processed region is set such that it comprises the entire individual image that was captured. This has the advantage that, for selecting the analysis region, where the coating begins can be easily determined using the pore- and oxide-regions. To save computing power, however, the processed region can preferably be selected such that it exclusively comprises regions of the individual image that show the surface of the coating. In this case the analysis region preferably corresponds to the processed region. Alternatively the processed region can preferably encompass at least all regions that show the surface of the coating as, for example, a rectangular frame. In this case the analysis region must again fall within the processed region.

In a manner analogous to the analysis region, the processed region can be selected or predefined either manually by an operator or automatically by the data processing unit 32.

The storing of a value pair can, for example, occur automatically when an individual image is focused and the optionally present sampling frame is set. The storing of another value pair can, for example, occur automatically when it has been recognized that another analysis region is captured. This can be recognized, for example, by a comparison of the individual images of the image sequence. The minimum number of value pairs to be captured can be preset.

The attributes (name of layer, date, scale, and result of the statistical analysis) of the two values "pore proportion" and "oxide proportion" can be automatically included in the image and stored. The reference image and the results of the layer analysis are thus stored together. Mistakes can thereby be avoided.

Instead of moving the measurement table, the relative movement between polished specimen and image capture device can also be achieved by moving the image capture device using an appropriate movement device, such as, for example, a drive.

Both the measurement table and the image capture device can be movable in an electrically, pneumatically, or hydraulically operable manner.

The individual units and devices can be formed separately from one another and/or integrally. For example, the display device and/or the data processing unit can be formed spatially separated from the device 24 schematically shown in FIG. 4. The data processing unit can, e.g., be formed integrally with the image capture device and/or the display unit.

Instead of the ratio of pixels that represent pore regions and oxide regions, the data processing unit can also or instead calculate only the numbers of pixels and enter them into a table, as was noted above. These numbers or their average values can then be set in relation to, for example, a total number of pixels that represent the coating. Alternatively, for a known or constant size of the coating in the individual image, a quality assessment can also be achieved by using only the calculated numbers of the pixels.

The target number of measured value pairs is preferably 5 to 50 measured value pairs, more preferably 7 to 30 measured value pairs, and still more preferably 10 to 15 measured value pairs, such as, for example, 10, 12, or 15 measured value pairs for each region having approximately identical layer properties.

The frequency, at which the individual images are captured, is preferably between 1 Hz and 100 Hz, more preferably between 10 Hz and 30 Hz, and still more preferably between 25 Hz and 30 Hz, such as, for example, 25 Hz or 30 Hz.

Depending on design requirements, exemplary embodiments of the data processing unit 32 of the present disclosure may be implemented in hardware and/or in software. The data processing unit 32 can be configured using a digital storage medium, for example one or more of a ROM, a PROM, an EPROM, an EEPROM, a flash memory, etc., on which electronically readable control signals (program code—instructions) are stored, which interact or can interact with one or more programmable hardware components to execute programmed functions.

The (each) programmable hardware component can be constituted by a processor, which may comprise a computer processor (CPU=central processing unit), an application-specific integrated circuit (ASIC), an integrated circuit (IC), a computer, a system-on-a-chip (SOC), a programmable logic element, and/or a field programmable gate array (FGPA). A microprocessor is a typical component of a data processing unit 32 or processor according to the present teachings.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods or functions described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the data processing unit 32 or processor, are implemented as a program, firmware, computer program, or computer program product including a program, or as data, wherein the program code or the data is operative to perform one of the methods when the program runs on (is executed by) a processor or a programmable hardware component. The program code or the data can for example also be stored on a machine-readable carrier or data carrier, such as any of the types of digital storage media described above. The program code or the data can be, among other things, source code, machine code, bytecode or another intermediate code.

A program according to an exemplary embodiment can implement one of the methods or function during its performance, for example, such that the program reads storage locations and/or writes one or more data elements into these storage locations, wherein switching operations or other operations are induced in transistor structures, in amplifier structures, or in other electrical, electronic, optical, magnetic components, or components based on another functional or physical principle. Correspondingly, data, values, sensor values, or other program information can be captured, determined, or measured by reading a storage location. By reading one or more storage locations, a program can therefore capture, determine or measure sizes, values, variables, and other information, as well as cause, induce, or perform an action by writing in one or more storage locations, as well as control other apparatuses, machines, and components, and thus for example also perform any complex process that the air compressor may be designed to perform.

Although some aspects of the present teachings have been described in the context of a device or apparatus, it is to be understood that these aspects also represent a description of a corresponding method, so that a block or a component of a device or apparatus is also understood as a corresponding method step or as a feature of a method step. In an analogous manner, aspects which have been described in the context of or as a method step also represent a description of a corresponding block or detail or feature of a corresponding device.

As was noted above, the electronic image capture device 28 may preferably comprise a digital camera, such as a CMOS (Complementary Metal Oxide Semiconductor) camera or a CCD (charged coupled device) camera, as are well known in the art and are utilized with known optical (light) microscopes. It is also preferable that a black-and-white (monochrome) camera is used, instead of a color (RGB) camera. By capturing monochrome images (i.e. as grey or brightness values), the resulting data may be used directly, or after relatively minimal processing, in the step of associating the pixels with the various surface classifications (e.g., labelling the pixels as pores, oxides and matrix). Of course, a color camera also may be used, although it would be necessary to perform additional signal processing to convert the color (RGB) data into grey values prior to the pixel classification step.

The illumination of the surface of the coating may be, e.g., a broad spectrum white light or one or more discrete wavelengths or one or more wavelength ranges. Optical filters may be used to filter the illumination light before it strikes the surface of the coating and/or to filter the light that is reflected back from the coating surface before reaching the camera.

The size of the pixels and/or the resolution of the image may be appropriately selected in order to improve the accuracy of the pixel classification. The resolution of the camera is preferably selected such that the surface portion of the pores are negligibly small in the sub-pixel range of the surface portion of all pores. Because small pores in the range of 1-5 microns ($\mu m$) occupy a significant portion (about 10%) of the total pore surface of a typical coating that may be analysed according to the present teachings, the pixel size of the camera preferably is less than 0.5 $\mu m$ based upon the magnification that is used. For example, a camera having 5 megapixels (2560×1920) may be used with a magnification such that an image field of 640×480 $\mu m$ is observed. With such a configuration, the pixel size is 0.25 $\mu m$ and the image field is sufficiently large so that a statistically significant result can be obtained. Thus, the pixel size is preferably 0.5 $\mu m$ or less, more preferably 0.25 $\mu m$ or less and even more preferably 0.1 $\mu m$ or less, in particular in applications of the present teachings for assessing the coatings of a cylinder block.

Additional embodiments of the present disclosure include, but are not limited to:

1. A method for assessing the quality of a surface of a coating of a component, including:

capturing (or initiating the capture of) an image sequence (live-video) comprising a plurality of individual images of different regions (or of the same and different regions) of the surface of the coating of the component using an electronic image capture device (28), processing a processed region of each of the captured individual images (of the live-video) in real time (live with or immediately after the capturing of the images) in a data processing unit (32) (e.g., in parallel with the capture of the image sequence) such that pore regions (50) and oxide regions (52) of the coating, which pore regions (50) and oxide regions (52) are present in the processed region, are marked in a processed image in a manner that they are differentiable from each other, (calculating and) storing value pairs, each including a first value and second value, for a plurality of the processed individual images in a storage unit (34), wherein the first value specifies a first number of pixels, which represent pore regions (50) in an analysis region that corresponds to the processed region or that lies therein, of the individual image (42) currently being processed, or a ratio of the first number of pixels to a total number of pixels in the analysis region, and the second value specifies a second number of pixels that represent oxide regions (52) in the analysis region of the individual image (42) currently being processed, or a ratio of the second number of pixels to the total number of pixels in the analysis region, and calculating, in the data processing unit (32), a first average value of the first values and a second average value of the second values and storing of the calculated average values in the storage unit (34).

2. The method according to the above embodiment 1, further including:

displaying each of the (captured and) processed images in real time (live) on a display device (36) (in a live preview) such that the marked pore regions (50) and the marked oxide regions (52) are displayed in the displayed individual image (42) in a manner that they are differentiable from each other (in the live preview).

3. The method according to the above embodiment 2, wherein the first value and the second value are displayed on the display device (36) with the display of each of the processed individual images (42) in real time (live or in the live preview), the first value and the second value being calculated based on the analysis region present in the respectively displayed individual image (42).

4. The method according to one of the above embodiments 1 to 3, further including:

selecting an analysis region, whose first value corresponds to the first average value or is close to it or whose second value corresponds to the second average value or is close to it, and linking or storing together the selected analysis region or the individual image corresponding to the analysis region as a reference image with the first and second average value.

5. The method according to the above embodiment 4, wherein each reference image is stored with at least one of: a name of the measurement series, the surface, the date of the capture, or the scale.

6. The method according to one of the above embodiments 1 to 5, further including:

storing each individual image (42) for which a value pair is stored, and linking each stored individual image to the corresponding value pair.

7. The method according to one of the above embodiments 1 to 5, wherein:

the individual images, for which the value pairs have been stored, are not stored, or the individual images, for which the value pairs have been stored, are not permanently stored in the storage unit (34), and/or the processed region comprises the entire captured image, and/or the analysis region is a region of the individual image that exclusively represents the coating.

8. The method according to one of the above embodiments 1 to 7, further including:

moving of the component relative to the image capture device (28) or vice versa using a drive device, controlled by the data processing unit (32), to capture, using the image capture device (28), the image sequence having the individual images of different regions of the surface of the component, and/or automatic focusing of the image capture device (28), and/or outputting of an error signal when one of the average values is above a particular predetermined upper limit value or below a particular predetermined lower limit value.

9. The method according to one of the above embodiments 1 to 8, further including:

calculating and storing a standard deviation of the first values and/or storing a maximum and of a minimum first value, and/or calculating and storing a standard deviation of the second values and/or storing a maximum and of a minimum second value, and optionally storing the average values and/or the standard deviations and/or the maximum and minimum values in metadata of the reference image or linking thereof with the reference image.

10. The method according to one of the above embodiments 1 to 9, wherein:

the pore regions (50) have a darker gray value than the oxide regions (52), and the oxide regions (52) have a darker gray value than the other regions of the region of the surface, for marking the pore regions (50) and the oxide regions (52) in the processing of each captured individual image, a pixel within a first gray-value range is marked as a pore region (50), and a pixel within a second gray-value range is marked as an oxide region (52), and the gray-value ranges or their limits are optionally determined according to Otsu's method.

11. The method according to one of the above embodiments 1 to 10, wherein:

the component is a polished specimen (18) of a cylinder bore of a cylinder block (10), which cylinder bore is provided with a coating, and, in the region that is captured using the image capture device (28), the surface of the polished specimen (18) is formed at least partially from the coating, and optionally an automatic detecting of the region that is to be captured is effected.

12. The method according to one of the above embodiments 1 to 11, further including:

selecting, using an operator input unit (38), the analysis region in the individual image, for which analysis region the first value and the second value are calculated, or automatically selecting the analysis region in the individual image, for which analysis region the first value and the second value are calculated, using a thresholding method executed in the data processing unit (32).

13. An image processing device for assessing the quality of a surface of a coating of a component, including:

an electronic image capture device (28) configured to capture an image sequence (live-video) comprising a plurality of individual images of different regions (or of the same and different regions) of the surface of the coating of the component (18), a data processing unit (32) configured to:

process a processed region of each of the captured individual images (of the live-video) in real time (live with or immediately after the capturing of the images) such that pore regions (50) and oxide regions (52), which are present in the processed region, of the coating are marked in a processed image in a manner that they are differentiable from each other, calculate (and store) value pairs, each including a first value and a second value, for different (a plurality of the) processed individual images, wherein the first value specifies a first number of pixels, which represent pore regions (50) in an analysis region that corresponds to the processed region or that lies therein, of the individual image (42) currently being processed, or a ratio of the first number of pixels to a total number of pixels in the analysis region, and the second value specifies a second number of pixels that represent oxide regions (52) in the analysis region of the individual image (42) currently being processed, or a ratio of the second number of pixels to a total number of pixels in the analysis region, and calculate (and store) a first average value of the first values and a second average value of the second values, and a storage unit (34) configured to store the value pairs and the average values.

14. The image processing device according to the above embodiment 13, further including:

a display device (36) configured to display each of the (captured and) processed images in real time (live or in a live preview) such that the pore regions and the oxide regions are marked in the displayed images in a manner that they are differentiable from each other, wherein, optionally, the first value and the second value are displayed with the display of each of the processed individual images (42) in real time (live or in the live preview) on the display device (36), the first value and the second value being calculated based on the analysis region present in the respectively displayed individual image (42).

15. The image processing device according to the above embodiment 13 or 14, wherein the data processing unit (32) is configured to generate an error signal and output the error signal to the display device (36) and/or to an output unit (40) when one of the first or second average values is above a particular predetermined upper limit value or is below a particular predetermined lower limit value.

One (non-limiting) basic or general concept of the above described method of capturing images and processing them in real time and storing value pairs of at least a plurality of processed images bears a general similarity to known image processing methods used in conventional digital cameras that have a display capable of displaying a live preview of the image sequence (live video) currently being captured by the electronic capture device (e.g., a CCD or CMOS digital imagers). That is, after start up of the camera, a sequence of images is captured at a certain frequency, which is similar to, e.g., the above aspect 1. Each captured image of the sequence is immediately processed in real time and displayed live or as a live preview on the display of the conventional camera, which is similar to, e.g., the above aspect 2. If the conventional camera is programmed to perform, for example, face detection, the face detection process is included in the real time processing such that recognized faces are marked by permanently updated marking frames in the live preview (see also above aspect 2). Such face detection is comparable to the image segmenting and thresholding processing according to the present teachings, wherein pores and oxides are labelled/marked and shown in the display. However, in a conventional digital camera, when the user presses the shutter release, the entire image is stored. On the other hand, in the image processing according to the presently described (non-limiting) basic or general concept of the teachings, only a value pair (i.e. two numerical values) of the pores and oxides within a preselected analysis region of a captured image is stored in accordance with the user's input (e.g., in the above aspect 1). The captured image, from which the value pair was derived, is thus discarded, i.e. not stored, thereby reducing further image processing and storing requirements. Of course, instead of pressing a shutter release in order to store an image, conventional digital cameras may also include a function for automatically storing the image after a smile is detected in the detected face. Similar thereto, the value pairs also may be automatically stored after a predetermined condition is fulfilled (e.g., in the above aspect 12).

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims. It is explicitly stated that all range specifications or specifications of groups of units disclose every possible intermediate value or subgroup of units for the purpose of the original disclosure as well as for the purpose of limiting the claimed invention, in particular also as the limit of a range specification.

REFERENCE NUMBER LIST

10 Cylinder block
12 Cylinder
14 Coating
16 Inner surface
18 Polished specimen
20 Test specimen
22 Cuboid part
24 Device
26 Measurement table
28 Image capture device
30 Drive (drive device)
32 Data processing unit
34 Storage unit
36 Display device
38 Operator input unit
40 Output unit
S1 First threshold value
S2 Second threshold value
R1 First gray-value range
R2 Second gray-value range
R3 Third gray-value range
M1 First maximum
M2 Second maximum
M3 Third maximum
42 Screen view (individual image displayed)
44 Coated part cross-sectional view 46 Coating cross-sectional view
48 Embedding material cross-sectional view
50 Pore region
52 Oxide region
54 Sampling frame
56 Name field
58 Scale field
60 Value-display region
62 Average-value-display region

I claim:

1. A method for assessing the quality of a surface of a coating of a component, including:
   (a) capturing an image of a portion of the surface of the coating using an electronic image capture device,
   (b) processing at least a portion of the captured image in real time in a data processing unit to identify first pixels corresponding to pore regions in an analysis region of the captured image and to identify second pixels corresponding to oxide regions in the analysis region of the captured image, the analysis region being equal in size to the captured image or smaller than the captured first image,
   (c) calculating a first value for the analysis region of the captured image, the first value representing one of (i) a total number of the first pixels in the analysis region of the captured image, or (ii) a ratio of the total number of the first pixels to a total number of pixels in the analysis region of the captured image,
   (d) calculating a second value for the analysis region of the captured image, the second value representing one of (i) a total number of the second pixels in the analysis region of the captured image, or (ii) a ratio of the total number of the second pixels to the total number of pixels in the analysis region of the captured image,
   (e) storing, in a storage unit, the calculated first and second values as a value pair for the analysis region of the captured image,
   (f) performing steps (a) to (e) for a plurality of further captured images,
   (g) calculating, in the data processing unit, a first average value of the stored first values and a second average value of the stored second values, and
   (h) storing the calculated first and second average values in the storage unit.

2. The method according to claim 1, further including:
displaying each of the processed captured images in real time on a display device such that the first pixels corresponding to the pore regions are visually differentiable from the second pixels corresponding to the oxide regions.

3. The method according to claim 2, further including:
displaying the calculated first value and the calculated second value on the display device in real time together with each of the respective analysis regions of the captured images.

4. The method according to claim 1, further including:
after step (h), capturing additional images for selecting additional analysis regions of different portions of the surface of the coating,
performing step (b) on each of the selected analysis regions,
performing at least one of step (c) or step (d) on each of the selected analysis regions,
comparing at least one of: (i) the calculated first value of each of the selected analysis regions to the stored first average value or (ii) the calculated second value of each of the selected analysis regions to the stored second average value,
selecting one of the analysis regions from among the additional selected analysis regions that has a calculated first value equal, or substantially equal, to the stored first average value or that has a calculated second value equal, or substantially equal, to the stored second average value, and
linking or storing together with the first and second average value one of: the selected analysis region or the captured additional image corresponding to the selected analysis region, to generate a reference image.

5. The method according to claim 1, wherein step (e) further includes:
not storing the analysis regions or captured images together with the respective value pairs for the analysis regions.

6. The method according to claim 1, further comprising selecting the analysis region such that the analysis region contains only the coating of the component.

7. The method according to claim 1, further including:
outputting an error signal when at least one of the first and second average values is above a predetermined upper limit value or is below a predetermined lower limit value.

8. The method according to claim 4, further including:
calculating and storing with metadata of the reference image or linking with the reference image at least one of:
a standard deviation of the first values;
a maximum and a minimum of the first values,
a standard deviation of the second values, or
a maximum and a minimum of the second values.

9. The method according to claim 1, wherein:
pixels having a gray value within a first gray-value range are labelled as the pore regions,
pixels having a gray value within a second gray-value range are labelled as oxide regions, and
the first gray-value range does not overlap, and is darker than, the second gray value range.

10. The method according to claim 1, wherein the component is a polished specimen of a cylinder bore of a coated cylinder block and the coating is a metal oxide coating.

11. The method according to claim 1, further including:
selecting the analysis region in the captured image for calculation of the first value and the second value by one of: (i) manually inputting the selected analysis region via an operator input unit or (ii) performing a thresholding method in the data processing unit to automatically select the analysis region.

12. The method according to claim 1, wherein step (b) further comprises performing a thresholding method on the pixels of the at least a portion of the captured image to segment the first pixels and the second pixels.

13. The method according to claim 4, wherein:
the component is a polished specimen of a coated cylinder bore of a cylinder block and the coating is a metal oxide coating,
pixels having a gray value within a first gray-value range are labelled as the pore regions,
pixels having a gray value within a second gray-value range are labelled as oxide regions, and
the first gray-value range does not overlap, and is darker than, the second gray value range.

14. The method according to claim 13, wherein:
step (b) further comprises performing a thresholding method on the pixels of the at least a portion of the captured image to segment the processed portion of the captured image to identify the first pixels and the second pixels and to identify a metal matrix of the coating; and
automatically selecting the analysis region by selecting a portion of the captured image that contains only first pixels, second pixels and pixels corresponding to the metal matrix of the coating.

15. The method according to claim 14, further including:
outputting an error signal when at least one of the first and second average values is above a predetermined upper limit value or is below a predetermined lower limit value.

16. The method according to claim 15, further including:
displaying each of the processed images on a display device such that the first pixels corresponding to the pore regions are visually differentiable from the second pixels corresponding to the oxide regions, and
displaying the calculated first value and the calculated second value on the display device in real time together with each of the respective analysis regions.

17. An image processing device for assessing the quality of a surface of a coating of a component, including:
an electronic image capture device,
at least one processor,
at least one storage unit; and
a non-transitory computer readable medium comprising computer readable instructions that, when executed by the at least one processor, cause the at least one processor to:
(a) cause the electronic image capture device to capture an image of a portion of the surface of the coating,
(b) process at least a portion of the captured image in real time to identify first pixels corresponding to pore regions in an analysis region of the captured image and to identify second pixels corresponding to oxide regions in the analysis region of the captured image, the analysis region being equal in size to the captured image or smaller than the captured image,
(c) calculate a first value for the analysis region of the captured image, the first value representing one of (i) a total number of the first pixels in the analysis region of the captured image, or (ii) a ratio of the total number of the first pixels to a total number of pixels in the analysis region of the captured image,
(d) calculate a second value for the analysis region of the captured image, the second value representing one of (i) a total number of the second pixels in the analysis region of the captured image, or (ii) a ratio of the total number of the second pixels to the total number of pixels in the analysis region of the captured image,
(e) store, in the at least one storage unit, the calculated first and second values as a value pair for the analysis region of the captured image,
(f) perform steps (a) to (e) for a plurality of further captured images,
(g) calculate a first average value of the stored first values and a second average value of the stored second values, and
(h) store the calculated first and second average values in the at least one storage unit.

18. The image processing device according to claim 17, further including:
a display device,
wherein the non-transitory computer readable medium further comprises computer readable instructions that, when executed by the at least one processor, cause the at least one processor to:
sequentially display each of the processed captured images, as well as the value pairs respectively calculated from the analysis regions, in real time on the display device such that the pore regions are visually differentiable from the oxide regions.

19. The image processing device according to claim 17, wherein the non-transitory computer readable medium further comprises computer readable instructions that, when executed by the at least one processor, cause the at least one processor to:
generate and output an error signal when one of the first average value or the second average value is above a predetermined upper limit value or is below a predetermined lower limit value.

20. A method for assessing the quality of a surface of a coating of a component, including:
initiating the capture of an image sequence comprising a plurality of individual images of different regions, or of the same and different regions, of the surface of the coating of the component using an electronic image capture device,
processing, in a data processing unit, the image sequence in real time to differentiate at least pore regions and oxide regions present in the coating,
for an analysis region of a plurality of the processed captured individual images, calculating, in the data processing unit, in real time a first value and second value, wherein the first value represents one of (i) a first number of pixels that correspond to pore regions in the analysis region of the captured individual image currently being processed, or (ii) a ratio of the first number of pixels to a total number of pixels in the analysis region, and wherein the second value represents one of (iii) a second number of pixels that correspond to oxide regions in the analysis region of the captured individual image currently being processed, or (iv) a ratio of the second number of pixels to the total number of pixels in the analysis region,
storing, in a storage unit, the calculated first values and the calculated second values as value pairs for each of the processed captured individual images, and
calculating, in the data processing unit, a first average value of the stored first values and a second average value of the stored second values and storing of the calculated first and second average values in the storage unit.

21. The method according to claim 20, further including:
displaying each of the processed captured individual images in real time on a display device as a live preview such that the first pixels corresponding to the pore regions are visually differentiable from the second pixels corresponding to the oxide regions.

22. The method according to claim 21, further including:
displaying the calculated first value and the calculated second value on the display device in real time together with each of the respective analysis regions of the each of the processed captured individual images in the live preview.

* * * * *